United States Patent [19]

Hodgkinson et al.

[11] 4,316,565
[45] Feb. 23, 1982

[54] SHEET TRANSFER APPARATUS

[75] Inventors: Joseph B. Hodgkinson, Billinge, near Wigan; Geoffrey H. Branch, Golborne, near Warrington, both of England

[73] Assignee: Pilkington Brothers Limited, St. Helens, England

[21] Appl. No.: 13,632

[22] Filed: Feb. 21, 1979

[30] Foreign Application Priority Data

Feb. 20, 1978 [GB] United Kingdom ............... 6685/78

[51] Int. Cl.³ ...................... C03B 33/02; B65H 29/32
[52] U.S. Cl. ........................................ 225/99; 83/94; 83/152; 83/156; 83/158; 198/370; 198/689; 225/3; 225/96.5; 225/97; 271/184; 271/197
[58] Field of Search ........................ 225/3, 2, 96.5, 97, 225/99; 83/94, 156, 158, 152; 271/184, 225, 197; 198/370, 372, 689

[56] References Cited

U.S. PATENT DOCUMENTS

| | | | |
|---|---|---|---|
| 3,202,302 | 8/1965 | Insolio | 198/689 X |
| 3,291,282 | 12/1966 | Pedagno | 198/689 X |
| 3,480,160 | 11/1969 | Barradell-Smith et al. | 198/689 X |
| 3,608,895 | 9/1971 | Kalven | 271/197 |
| 3,713,650 | 1/1973 | Hodgkinson et al. | 271/185 |
| 3,941,370 | 3/1976 | Martin et al. | 198/370 X |
| 4,131,222 | 12/1978 | Hodgkinson | 225/3 |

Primary Examiner—Frank T. Yost
Attorney, Agent, or Firm—Sughrue, Mion, Zinn, Macpeak and Seas

[57] ABSTRACT

Apparatus for marshalling glass sheets comprises a conveyor capable of conveying an array of sheets lying in a transverse sheet array across the conveyor to a sheet removal station, transverse conveying means extending transversely above the conveyor and transfer means operable to transfer a sheet or sheets from the conveyor to the transverse conveying means at the sheet removal station. The transfer means includes a plurality of selectively and separately operable transfer devices, such as lifting devices, extending in an array across the array of sheet positions, and control means for controlling simultaneous operation of selected transfer devices.

15 Claims, 5 Drawing Figures

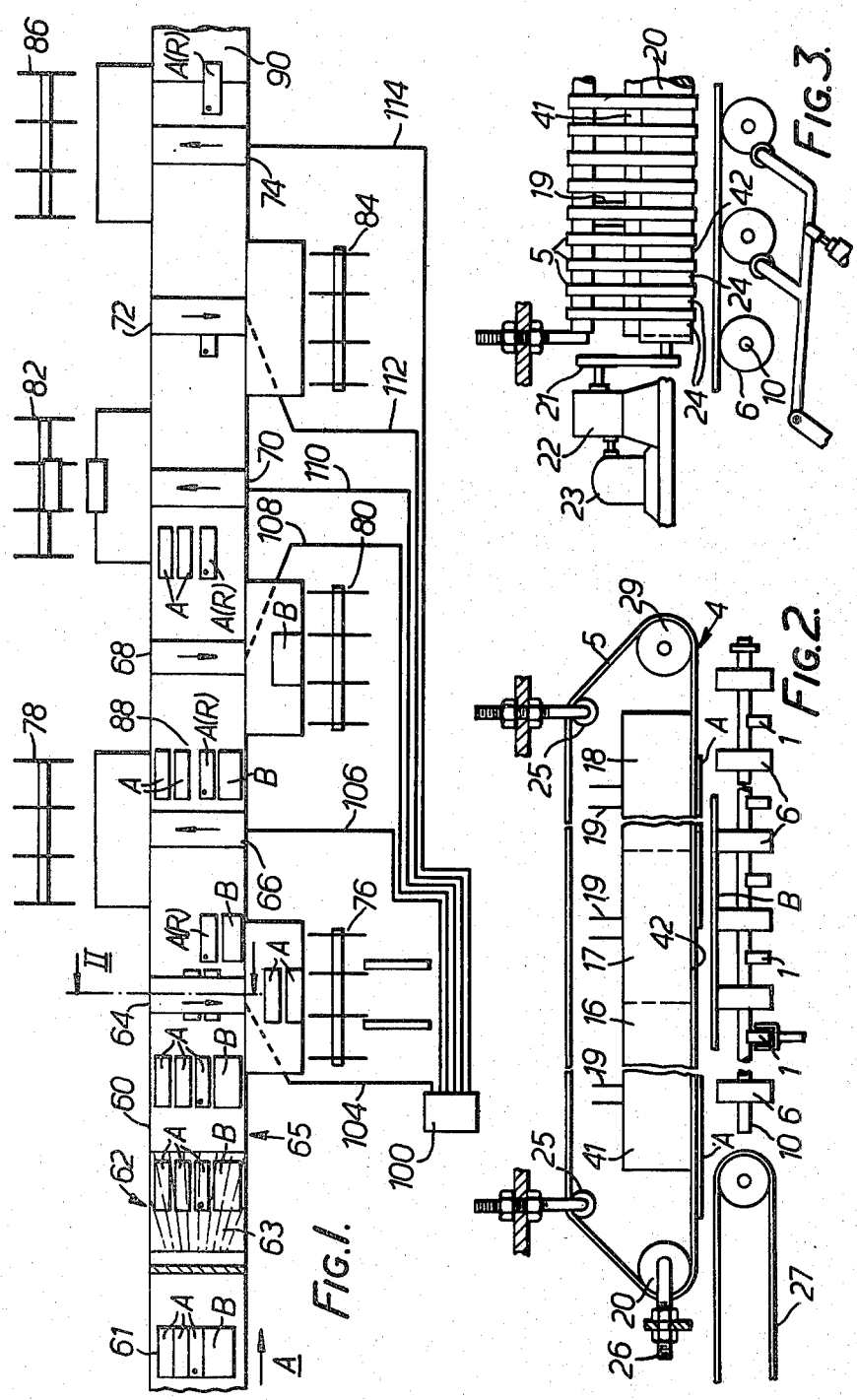

SHEET TRANSFER APPARATUS

BACKGROUND OF THE INVENTION

This invention relates to a method and apparatus for marshalling sheets including for example sheet transfer apparatus for transferring a selected sheet or sheets, e.g. of glass, from a conveyor carrying a plurality of such sheets extending transversely across it to a position at one side of the conveyor. Such apparatus is particularly but not exclusively adapted for use in conjunction with an apparatus for snapping a sheet of glass along one or more score lines extending along the sheet, as described in our U.S. Pat. No. 4,131,222. The latter apparatus includes a plurality of conveyors diverging away from one another along their direction of advance, so that the result of snapping a sheet of glass along one or more score lines parallel to the direction of advance is to produce an array of sheet portions spaced apart from one another and extending transversely across the conveyor assembly. It is a particular object of the present invention to provide a method and apparatus capable of effecting selective transfer of sheets from such an array.

Arrangements are known for handling glass sheets in which a large sheet is conveyed longitudinally along a main conveyor and cut into two along a longitudinal line. The two separate sheets are then transferred onto side branch conveyors extending at right angles to the main conveyor and then the sheets may again be cut as desired along longitudinal lines. These further cut sheet portions may then be transferred onto further side leg conveyors parallel to the main conveyor. The operation may be repeated as many times as necessary by use of many side leg conveyors until the final sheet sizes are obtained on each of the side leg conveyors and fed to a respective stacker. However such an arrangement is wasteful of space, as well as cutting and inspecting equipment and personnel. Each time a sheet is conveyed onto a new branch conveyor separate scoring and/or snapping equipment is needed for that particular conveyor. The extensive array of conveyors inevitably extends over a large floor space and separate inspection personnel are required on each side leg leading to a stacker. Separate cullet collection facilities for collecting reject sheets are also needed for each side leg. Furthermore, in order to achieve economic use of such an extensive system of side leg conveyors, it is necessary to operate with relatively long runs on each of the sheet sizes provided by the system as substantial mechanical alterations are also needed to vary the cutting pattern used.

SUMMARY OF THE INVENTION

It is an object of the present invention to provide improved apparatus and methods which reduce the aforesaid problems and more particularly to provide apparatus which is relatively compact and has sufficient flexibility and simple adaptability to handle various sheet sizes, and/or combinations of sheet sizes.

The invention provides apparatus for marshalling sheets comprising a conveyor capable of conveying an array of sheets lying in a transverse sheet array across the conveyor to a sheet removal station, transverse conveying means extending transversely above the conveyor so as to be capable of receiving a sheet from each and every position in said sheet array at said sheet removal station, transfer means operable to transfer a sheet or sheets from the conveyor to the transverse conveying means at the sheet removal station, said transfer means comprising a plurality of selectively and separately operable transfer devices extending in an array across the array of sheet positions, and control means for controlling the action of said transfer devices to cause simultaneous operation of any selected transfer devices and thereby transfer a selected sheet or sheets to the transverse conveying means.

The invention also provides a method for marshalling sheets comprising conveying a plurality of sheets on a conveyor to a sheet removal station, the sheets lying in an array of possible positions extending transversely across the conveyor, selectively actuating control means to select one or more positions in the array of positions from which sheets are to be removed from the conveyor at the sheet removal station, simultaneously transferring one or more sheets from the selected position or positions on the conveyor to transverse conveying means extending transversely above the conveyor at the sheet removal station, and moving the selected sheet or sheets on the transverse conveying means to a position at one side of the conveyor.

Preferably the transverse conveying means provides sequential delivery to a stacker of the sheets transferred to it at the sheet removal station.

Preferably the transverse conveying means includes suction means adapted to grip sheets which are lifted into contact with it and to convey them transversely to one side of the main conveyor and the transfer means comprise lifting means disposed below the main conveyor and adapted to lift a selected one or more of said sheets at any one or more of a plurality of positions spaced across the main conveyor into contact with the transverse conveying means when the sheet or sheets arrives adjacent it.

Preferably a stacking device is provided for the sheets conveyed by each transverse conveying means.

Preferably the apparatus includes a plurality of transverse conveying means located at respective sheet removal stations spaced along the main conveyor.

Preferably the transfer means comprise a plurality of transfer devices which may be separately adjusted to an operative or non-operative condition under the control of said control means.

Preferably the control means is programmable to adjust the transfer devices in accordance with a predetermined pattern within the array of transfer devices.

The apparatus may include means for supplying a plurality of streams of sheets which are carried by the main conveyor with each stream running lengthwise of the main conveyor, the or each transverse conveying means and associated lifting means being selectively operable to pick off sheets from any one or more of the streams. Thus, sheets of any one or more of the streams can be selectively removed from the main conveyor at any one or more of the stations at which transverse conveying means is provided. The sheets may be supplied in a plurality of arrays, each array comprising a plurality of sheets spaced across the main conveyor, the transverse conveying means and lifting means being adapted to pick off the main conveyor selectively any one or more of the sheets in an array at the location of the transverse conveying means.

The apparatus may include inspection means at an inspection station located upstream of the transverse conveying means. The apparatus may also include reject control means coupled to said control means, and operable to prevent operation temporarily of selected transfer devices at a sheet removal station if following inspection a selected sheet is to be rejected from removal at the sheet collection station.

Preferably the lifting means comprises an array of rollers extending across the width of the main conveyor beneath the transverse conveyor, the array of rollers being divided into groups, each of which groups forms a lifting device which can be raised independently of the other groups. The lifting means preferably also comprises a plurality of selector ram devices, one for each group of rollers, which can be independently controlled to raise a selected group or groups of rollers up to a level just below the path of a selected sheet or sheets on the main conveyor, and a further common ram device which is arranged to raise all the groups of rollers when the array of sheets arrives beneath the transverse conveyor, thereby lifting the selected sheet or sheets into contact with the transverse conveyor. Each group may comprise a pair of rollers spaced apart in the direction of the length of the main conveyor and mounted on a support member which can be pivoted by the respective selector ram device to permit the raising of the group of rollers to the level just below the path of the sheets on the main conveyor.

Preferably the support members of all the groups of rollers are mounted on a common horizontal pivot shaft, or a set of aligned horizontal pivot shafts, and the pivot shaft or shafts is or are mounted so as to be movable by the common ram device to raise all the groups of rollers. The pivot shaft or shafts may be mounted by means of mounting arms on a second horizontal pivot shaft which is mounted on a fixed part of the apparatus and is connected to the piston rod of the common arm device by a lever arm, the cylinders of the selector ram devices being also pivoted to a fixed part of the apparatus and forming, with the respective support members and mounting arms, a series of parallelogram linkages which guide the movement of the support members and their groups of rollers on actuation of the common ram device.

BRIEF DESCRIPTION OF THE DRAWINGS

FIG. 1 is a diagrammatic plan view of a sheet snapping and stacking installation incorporating six sheet transfer apparatus according to the present invention, FIG. 2 is a detailed transverse view on the line II—II of FIG. 1, showing the suction conveyor but omitting major portions of the lifting means for clarity, FIG. 3 is a view from the right-hand end of FIG. 2.

DESCRIPTION OF THE PREFERRED EMBODIMENT

Figure 4:
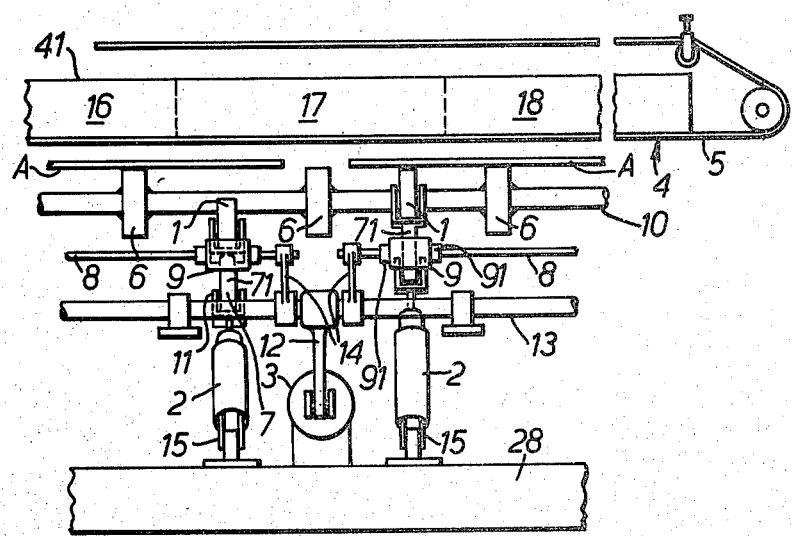
FIG. 4 is a detail view to a larger scale than FIG. 2, showing elements of the lifting means.

As illustrated in FIG. 1, the installation comprises a sheet snapping apparatus 62 as described and illustrated in our U.S. Pat. No. 4,131,222 which comprises a plurality of diverging conveyors 63. The installation further comprises a main line conveyor 60 which extends from the downstream end of the diverging conveyors 63, and six sheet transfer apparatus 64, 66, 68, 70, 72 and 74, in accordance with the present invention. Each sheet transfer apparatus is associated with a respective stacking apparatus 76, 78, 80, 82, 84 and 86 which may for example comprise a rotary stacker as described in our U.S. Pat. No. 3,713,650. At the end of the main conveyor 60 is a cullet disposal station 90.

For the sake of illustration, the drawing shows a sheet of glass 61, which has been provided with three scores parallel to the conveying direction, dividing it into three equal sheet sections A and a larger sheet section B. The scored sheet 61 is snapped and the snapped sections are separated laterally by the snapping apparatus 62. The main line conveyor 60 thus receives an array of glass sheet portions A, A, A, B, extending transversely across it, the sheets lying in respective sheet positions spaced apart from one another. The operation of each of the transfer apparatus 64, 66, 68, 70, 72 and 76 is under the control of a control unit 100 which is arranged to send signals, either mechanical or electrical, via control lines 104, 106, 108, 110, 112 and 114 to respective transfer apparatus. The control unit 100 may include a stored programme controlling a selected sequence of operations for the transfer apparatus or the control unit may be operated manually by an operator, for example by use of depressable keys or buttons, so as to ensure that each transfer device picks off the required sheets for collection by the appropriate stacker. An inspection station 65 is provided on the downstream side of the snapping apparatus 62, and for sake of illustration an observed defect has been marked on one of the sheet portions A. An operator at the inspection station can by operating an overriding reject control on the control device 100 send an appropriate signal, via control lines 104, 106, 108, 110, 112 and 114 to ensure that the defective or reject sheet (subsequently marked A (R)) will not be picked up by any of the sheet transfer apparatus but will pass to the cullet disposal station 90. The normal signals emitted by the control unit 100, other than the reject signal, ensure that the remaining sheet portions A, A, B are transferred to the appropriate stackers, e.g. two sheet portions A may be delivered by the sheet transfer apparatus 64 to stacker 76 and the sheet portion B to stacker 80, as shown. Alternatively, a pair of sheet portions A from a previous sheet 61 may be allowed to pass the sheet transfer apparatus 64, 66 and 68 and to be transferred by sheet transfer apparatus 70 into stacker 82, as shown.

FIGS. 2 to 5 illustrate the sheet transfer apparatus 64 in more detail. The other sheet transfer apparatus 66, 68, 70, 72 and 74 are each of the same construction as the apparatus 64.

The main line conveyor 60 is here illustrated as comprising a series of conveyor rollers 6 mounted on parallel shafts 10 which extend across the width of the conveyor 60 and are spaced apart in the direction of conveying. The sheet transfer apparatus comprises a transverse suction conveyor generally indicated at 4 disposed immediately above the main conveyor and adapted to grip by suction sheets which are lifted into contact with it and to convey them transversely to one side of the main conveyor, and lifting means shown in more detail in FIGS. 4 and 5, disposed below the main conveyor 60 and the suction conveyor 4. The lifting means comprises an array of rollers 1 extending in lines across the width of the main conveyor 60 beneath the suction conveyor 4. The lifting rollers 1 are divided into longitudinal groups, here shown as groups of two, each of which groups forms a lifting device which can be raised independently of the other groups. Each lifting device comprising a group or pair of lifting rollers 1 is mounted on a respective support arm 7 extending along the direction of travel of the conveyor 60, the rollers 1 being rotatably mounted in the forked ends of respective stub arms 71, integral with the support arm 7. The assembly of the pair of rollers 1 and the support arm 7 is free to pivot about the axis of a horizontal pivot shaft 8, on which the arm 7 is mounted by means of a bearing 9 located between pinned or grub-screwed collars 91 (FIG. 4). A selector ram device 2 has its piston rod connected by clevis 11 to the support arm 7 and its cylinder connected by clevis 15 to a fixed part 28 of the apparatus, so that extension of the ram device 2 causes the support arm to pivot about the pivot shaft 8 and thus to lift the lifting rollers 1 on that arm 7 between the conveyor rollers 6 and their transverse roller shafts 10, up to a position as shown in the right-hand side of FIG. 4 in which the lifting roller 1 lies immediately beneath the lower surface of a glass sheet A which is supported on the conveyor rollers 6.

Although only two pairs of lifting rollers 1 are shown in FIG. 4, it will be realised from FIG. 2 that in fact a large number of such lifting rollers 1 will be provided. Thirty or more rollers 1 may be provided in each line across the the conveyor 60 and each longitudinal pair of rollers 1 has its associated selector ram device 2 which can be independently operated as mentioned previously on receipt of a signal from the inspection station 65.

The pivot shaft 8 may extend in one piece from one side of the main line conveyor 60 to the other, or, as shown in FIG. 4, it may be divided into two or more parts. In both cases, the pivot shaft 8 is supported by means of arms 14 on a second pivot shaft 13, which is mounted in a fixed part of the apparatus. Arms 14 are pinned to both of pivot shafts 8 and 13, so that pivoting movement of shaft 13 causes pivot shaft 8 to describe an arcuate movement about the shaft 13, as will be realised from FIG. 5.

Figure 5:
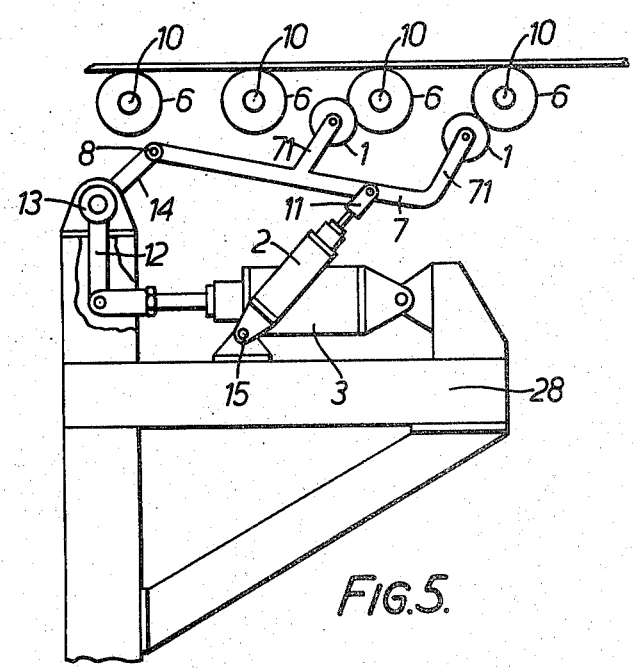
FIG. 5 is a view taken at right angles to FIG. 4 of the lifting means shown therein.

An arm 12 pinned to and depending from pivot shaft 13 is connected to the normally extended (as shown in FIG. 5) piston rod of a further ram device 3, whose cylinder is pivoted to the fixed part 28 of the apparatus. Actuation of the ram device 3 to retract its piston rod thus causes anti-clockwise rotation of pivot shaft 13, as seen in FIG. 5, and corresponding movement of pivot shaft 8 through an anti-clockwise arc. In conjunction with the selector ram devices 2 and the support arms 7, the arms 14 and pivot shaft 8 form a series of linkages of roughly parallelogram shape which thus cause all the support arms 7 and their respective pairs of lifting rollers 1 to be lifted upwards on actuation of the common ram device 3.

Where selector ram devices 2 have previously been extended, as in the right-hand side of FIG. 4, this further lifting is effective to raise any glass sheet A present above the associated lifting rollers 1 into contact with the suction conveyor 4. Where the selector ram devices 2 have not been extended, as in the left-hand side of FIG. 4, the lifting effected by the common ram device 3 does not raise the lifting rollers 1 above the level of the conveyor rollers 6, so that any glass plate being conveyed on the conveyor rollers is free to pass on the main line conveyor 60.

The construction of the suction conveyor 4 is illustrated in FIGS. 2 and 3. It comprises a suction plenum box 41, which may be partitioned as shown by the dotted vertical lines into, say, three compartments 16, 17 and 18 each of which is connected to suction means (not shown) through tubes 19. The lower surface 42 of the box 41 is of foraminous construction, being provided with approximately 1000 holes per square foot, each of between 1/16th and 3/32nd inch diameter. A plurality of narrow rubber conveyor belts 5 have parallel conveying runs across the lower surface 42 of the suction plenum box 41 from one side of the main conveyor 60 to the other, and the foraminous surface 41 is formed with shallow grooves to accommodate a part of the depth of the belts 5. The belts 5 pass around a grooved driving roller 20 at the end of the conveying run and over tensioning rollers 25 and a return roller 29. The driving roller 20 is provided with an adjustable mounting 26 by which its horizontal position can be adjusted as desired, while the tensioning rollers 25 are also adjustable for alignment and tensioning the belts. The drive roller 20 may be driven, for example, by an electric motor 23 through a reduction gearing 22 and a belt and pulleys 21 (FIG. 3) or any other appropriate means.

When a glass sheet A is lifted by the lifting rollers 1 into contact with the belts 5, it is gripped by the suction applied through the foraminous surface 42 between the belts 5 and can be conveyed transversely of the main conveyor 60 by movement of the belts 5. The division of the box 41 into compartments 16, 17 and 18 has the advantage that when no glass sheet is present beneath one of the compartments, the resulting increase in pressure does not affect the suction applied from the neighbouring compartment or compartments. The suction plenum box 41 terminates short of the driving roller 20, so that each glass sheet will drop from the conveyor belts 5 due to the reduction in the force applied by suction to the sheet as it passes away from the end of the suction box 41. A subsidiary transverse conveyor 27 is shown in FIG. 2 to receive the sheets from the suction conveyor 4 and to pass them to the stacker 76 (FIG. 1).

Sheet detectors, e.g. in the form of limit switches (not shown) are arranged beneath the side of the suction conveyor 4 downstream relative to the direction of movement of the conveyor 60 so as to contact the leading edge of a glass sheet being conveyed along the main line conveyor 60; these sheet detectors are connected to the means for driving the shafts 10 of the main line conveyor and the drive roller 20 of the suction conveyor.

In operation, the control unit 100 is programmed to suit the particular cutting pattern in operation at the snapping apparatus 62. When the operator at inspection station 65 has inspected an array of glass sheets received from the snapping apparatus 62, he operates the control device 100 to indicate rejection of only sheet A(R) and signals are then sent via lines 104, 106, 108, 110 and 114 to actuate at each sheet transfer apparatus the ram devices 2 associated with the lifting rollers 1 in the path of the sheet or sheets A,B which are to be transferred at that transfer apparatus. This ensures that the appropriate lifting rollers 1 are lifted to the position shown in the right-hand side of FIG. 4, immediately below the path of the selected glass sheets A,B, for the whole array of lifting rollers. The lifting rollers 1 in the path of the reject sheet A will all be left in the lower position as in the left-hand side of FIG. 4. When the installation is in continuous operation a computer (not shown) can be used to control automatically which sheets are transferred to the respective sheet transfer apparatus.

When the array of glass sheets reaches the appropriate position beneath the transfer apparatus 64 and actuates the sheet detectors, the main line conveyor 60 is stopped and the common ram device 3 for that particular transfer apparatus 64 is actuated to lift all the lifting rollers 1 of this transfer apparatus. Where the selector ram devices 2 have been actuated, the appropriate glass sheets A, B, will accordingly be lifted into contact with the belts 5 of the suction conveyor 4 and held thereagainst by the suction applied through the suction plenum box 41. The common ram device 3 then extends again, and the selector ram devices are retracted, so as to lower the lifting rollers to their fully lowered position. The main line conveyor 60 restarts and the suction conveyor 4 is also started, so as to convey the lifted sheets A, B, to one side as described above. Any glass sheets A, B, which have not been lifted into contact with the suction conveyor at this transfer apparatus 64, will then proceed on the main line conveyor to the next transfer apparatus, where the same process will be repeated.

The use of the common ram device 3 to effect the final lifting of all the lifting rollers at any one transfer apparatus has the advantage that the actuation of the selector rams 2 can be effected in advance, giving time for the selector rams to complete their full stroke in good time before the final lifting of the glass sheets into contact with the belts 5. If the selector rams 2 were used to effect the complete lifting stroke, there would be a danger that the rams 2 would not move in complete synchronism and that the glass sheets might accordingly be tilted and broken against the underside of the suction conveyor 4.

The suction applied to the suction plenum box 41 and the size and number of the holes in the foraminous lower surface 42 are matched to ensure that the pressure inside the box 41 will remain sufficiently low to hold a glass plate in suspension and in contact with the belts 5, despite the leakage of air around the glass plate and the edges of the belt and those areas of the surface 42 not covered by the glass plate. In conjunction with the use of approximately 1000 holes per square foot of 1/16th to 3/32nd inch size, we have found that a suitable pressure to use in the box 41 is approximately 5 to 15 inch water gauge below atmospheric.

The apparatus described and illustrated in the drawings is rapid and effective in operation and can be adjusted to deal with a wide variety of situations. As the operation of the lifting rollers 1 is totally adjustable to suit different cutting operations the apparatus is extremely flexible in its manner of operation and is very simply altered from one transfer programme to another. This allows cutting operations on a wide variety of sheet sizes and different combinations of sheet sizes to be efficiently handled by the simple apparatus shown in FIG. 1. Due to the simplicity of altering the particular lifting rollers 1 which are selected to be raised by the cylinders 2, the apparatus can readily be altered to deal with variation in the cutting pattern effected at station 62 so that the apparatus can deal with long or short runs of particular sheet sizes and thereby deal with large or small orders of particular sheet sizes. This is very advantageous in an automatic packing arrangement where short runs of a particular sheet size are sometimes required. The apparatus of FIG. 1 is also advantageous in that as it does not require the same number of sheets of each size to be processed, it is possible to make more efficient use of a large sheet when cutting into smaller sheets as the most efficient way of dividing the sheet can be adopted regardless of the numbers of different sized sheets which result. Furthermore the particular dividing pattern can be varied at will to suit any defects which are detected and the operation of the lifting rollers 1 varied to deliver the correct sheets to the correct stacks. The installation as illustrated in FIG. 1 only requires a single inspection station and a single cullet disposal station, with consequent advantages. The time required for completing the cycle of stopping the main line conveyor, lifting selected glass sheets from it and restarting it, can be as low as 2 to 5 seconds, allowing a high throughput of glass. The installation is also economical on space, as it only requires a single main line conveyor without branch conveyors as have been necessary in some cases in the prior art.

Although the above described apparatus is suitable for marshalling an array of sheets, the apparatus can also selectively transfer one or more sheets spaced both transversely and longitudinally of one another along the main conveyor. Each sheet travels in its respective stream running lengthwise of the main conveyor and the different streams are spaced across the main conveyor.

Although a plurality of transfer apparatuses are described above it will be understood that the invention includes embodiments having just one transfer apparatus. The sheets either being selected and transferred by that apparatus to one side of the conveyor or allowed to pass to a cullet disposal station.

Although the above described installation does not require branch conveyors, the various sheet transfer apparatus could be used to transfer sheets to respective branch conveyors if so required.

The method of operation described above involves stopping the main conveyor before lifting the selected glass sheets from it. It will be understood, however, that the invention also includes embodiments in which the main conveyor is not stopped prior to lifting the selected glass sheets and selected glass sheets are moving as they are lifted from the main conveyor.

Instead of using the suction conveyor 4 shown in the drawings the transverse conveyor may comprise a conveyor belt or belts on which a plurality of suckers or suction cups are mounted, the sheet or sheets creating a partial vacuum when they are pressed up against the suckers or suction cups. The partial vacuum is sufficient to hold the sheet or sheets against the conveyor belt or belts to allow them to be conveyed transversely over the main conveyor. A suction release means may then be provided to release the partial vacuum holding the sheet or sheets when they are at a position at one side of the main conveyor. The advantage of using suckers or suction cups is that it avoids the use of an external vacuum pump.

It will be appreciated that in the above examples, each time the transfer means is operated it may transfer one, or a plurality, or all of the sheets in the array across the conveyor depending on the selection which has been made at the control means. The control means may be preset in dependence on previous inspection of the sheets travelling along the conveyor in each sheet position. The transfer means may comprise lifting means as described above. Alternatively the transverse conveying means may be arranged to move up and down towards the conveyor with means for selectively controlling which sheets are picked off by the transverse conveying means.

We claim:

1. Apparatus for marshalling sheets comprising a conveyor capable of conveying an array of sheets lying in a transverse sheet array across the conveyor to a sheet removal station, transverse conveying means extending transversely above the conveyor so as to be capable of receiving a sheet from each and every position in said sheet array at said sheet removal station, transfer means operable to transfer a sheet or sheets from the conveyor to the transverse conveying means at the sheet removal station, said transfer means comprising a plurality of selectively and separately operable transfer devices extending in an array across the array of sheet positions, and control means for controlling the action of said transfer devices to cause simultaneous operation of any selected transfer devices and thereby transfer a selected sheet or sheets to the transverse conveying means.

2. Apparatus according to claim 1 in which said transfer devices are separately adjustable to an operative or non-operative condition under the control of said control means prior to actuation of the transfer devices to effect a transfer operation.

3. Apparatus according to claim 2 in which the control means is programmable to adjust the transfer devices in accordance with a predetermined selectable pattern within the array of transfer devices.

4. Apparatus according to claim 1 in which the transfer means comprise lifting means disposed below the conveyor and adapted to lift a selected one or more of said sheets into contact with the transverse conveying means.

5. Apparatus according to claim 4 in which the lifting means comprises a plurality of lifting rollers.

6. Apparatus according to claim 5 in which the lifting means includes a plurality of selector ram devices, each associated with a lifting device, which can be independently controlled to raise the lifting device to an operative position below the path of sheets on said conveyor, and a further common ram device coupled to a plurality of lifting devices and arranged on actuation to raise said plurality of lifting devices so that those lifting devices already moved to an operative position rise above the path of sheets on said conveyor and thereby lift a selected sheet or sheets into engagement with the transverse conveying means.

7. Apparatus according to claim 1 in which the transverse conveying means includes suction means adapted to grip sheets which are lifted into contact with it.

8. Apparatus according to claim 1 further comprising a plurality of transverse conveying means located at respective sheet removal stations spaced along the conveyor each being provided with associated transfer means.

9. Apparatus according to claim 8 in which each transverse conveying means is provided with a stacking device for stacking the sheets which are conveyed by the transverse conveying means.

10. Apparatus according to claim 9, further including sheet snapping means located upstream of the sheet removal station.

11. Apparatus according to claim 10 in which the snapping means is arranged to supply a succession of sheets on said conveyor in which the sheets lie in predetermined sheet positions across the conveyor.

12. Apparatus according to claim 1 further including an inspection station for inspecting the sheets prior to arrival on the conveyor at the sheet removal station.

13. Apparatus according to claim 12 further including a reject control coupled to said control means and operable to prevent operation temporarily of selected transfer devices at a sheet removal station if following inspection a selected sheet is to be rejected from removal at the sheet collection station.

14. A method for marshalling sheets comprising conveying a plurality of sheets on a conveyor to a sheet removal station, the sheets lying in an array of possible positions extending transversely across the conveyor, selectively actuating control means to independently select one or more positions in the array of positions from which sheets are to be removed from the conveyor at the sheet removal station, simultaneously transferring one or more sheets from the selected position or positions on the conveyor to transverse conveying means extending transversely above the conveyor at the sheet removal station, and moving the selected sheet or sheets on the transverse conveying means to a position at one side of the conveyor, and conveying from the sheet removal station any sheet remaining at a non-selected position of the array on the conveyor.

15. A method according to claim 14 in which the transverse conveying means conveys the transferred sheets and provides sequential delivery of the sheets to a stacking device which stacks the sheets.

* * * * *